(12) United States Patent
Faruque et al.

(10) Patent No.: US 9,156,500 B2
(45) Date of Patent: Oct. 13, 2015

(54) BOWTIE SHAPED ROOF BOW

(71) Applicant: FORD GLOBAL TECHNOLOGIES, LLC, Dearborn, MI (US)

(72) Inventors: Mohammed Omar Faruque, Ann Arbor, MI (US); Fubang Wu, Woodhaven, MI (US); Michael M. Azzouz, Livonia, MI (US); Yijung Chen, Ypsilanti, MI (US); David Anthony Wagner, Northville, MI (US); James Chih Cheng, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 14/049,611

(22) Filed: Oct. 9, 2013

(65) Prior Publication Data
US 2015/0097395 A1  Apr. 9, 2015

(51) Int. Cl.
*B62D 25/06* (2006.01)
*B62D 25/04* (2006.01)

(52) U.S. Cl.
CPC ............... *B62D 25/06* (2013.01); *B62D 25/04* (2013.01)

(58) Field of Classification Search
CPC ....... B62D 25/06; B62D 21/157; B62D 25/04
USPC ............ 296/187.03, 187.12, 187.13, 193.06, 296/210, 203.01
See application file for complete search history.

(56) References Cited

U.S. PATENT DOCUMENTS

| 1,029,570 | A  | * | 6/1912  | Miller |
| 5,000,507 | A  |   | 3/1991  | Baxter |
| 7,614,687 | B2 |   | 11/2009 | Nakamura et al. |
| 2009/0174228 | A1 | * | 7/2009 | Duguet et al. ................. 296/214 |

FOREIGN PATENT DOCUMENTS

EP  1036728 B1  9/2002

* cited by examiner

*Primary Examiner* — Stephen Gordon
(74) *Attorney, Agent, or Firm* — Raymond L. Coppiellie; Brooks Kushman P.C.

(57) ABSTRACT

A roof bow for a vehicle is provided that has a "bow-tie" shape including a central portion flanked by two triangular portions. The triangular portions are joined to right and left roof brackets that are, in turn, joined to right and left roof rails. The bow-tie roof bow may be assembled from extruded tubular parts. The bow-tie roof bow may be assembled in a clamshell structure including an upper shell and a lower shell that are joined together by welding. The roof bow may be formed in one piece as a sheet metal stamping having side portions that are wider than the central portion.

4 Claims, 5 Drawing Sheets

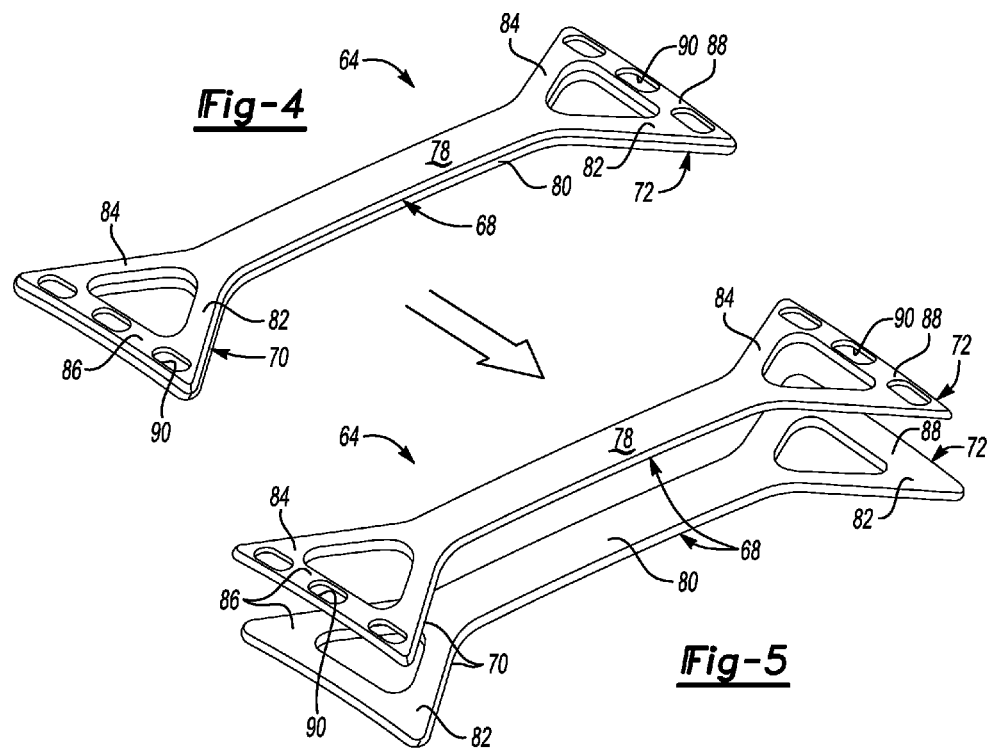
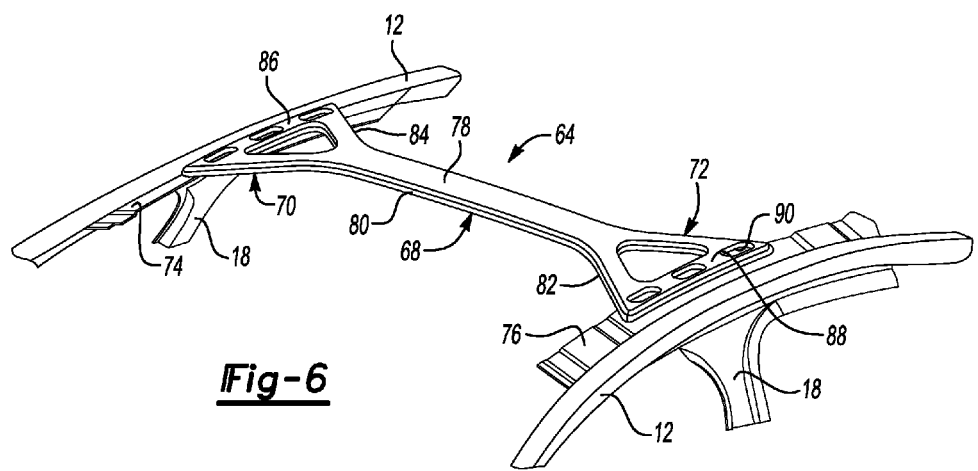

BOWTIE SHAPED ROOF BOW

TECHNICAL FIELD

This disclosure relates to the structure of a roof bow for a vehicle roof that minimizes intrusions into the passenger compartment in side impact collision tests ad roof crush tests.

BACKGROUND

Roof bows are attached to vehicle roof structures to strengthen the roof and support the roof rails. Current roof rail designs include a rail that extends transversely across the vehicle roof from one roof rail to the other roof rail and have a substantially uniform width as measured in the fore-and-aft direction. Such roof rails do not include lateral supporting reinforcements between the windshield header rail, the rail extending between the B-pillars, and the rail extending between the C-pillars.

Vehicles are subjected to Federal Motor Vehicle Safety Standards (FMVSS) tests in the United States. In FMVSS Side Pole Impact Tests a pole is impacted by the test vehicle that may engage the vehicle in a location where the roof rail is not supported by a transversely extending rail. The unsupported portion of the roof rail may allow unacceptable intrusions into the passenger compartment. Vehicles are also subjected to FMVSS Roof Crush Tests that apply an impact load to the vehicle roof in the area of the roof rail.

Improving test results in the above FMVSS tests is normally addressed by increasing the section size and the thickness of the parts of the roof rail. Increasing the section size and thickness of the roof rails adds weight to the vehicle and may reduce visibility below the roof rail. It is a current objective to reduce vehicle weight to achieve greater fuel efficiency. Any increase in weight is considered to be a problem.

The use of a K-shaped roof bow has been proposed to improve test performance that is joined to the roof rail by welds and rivets. A K-shaped roof bow joined by welds or rivets to the roof rail may separate in the test and limit the effectiveness of such a design in transferring loads from the roof rails to the K-shaped roof bow.

This disclosure is directed to addressing the above problems and other problems as summarized below.

SUMMARY

According to one aspect of this disclosure, a roof bow is provided for a vehicle having a roof. The roof bow includes a central portion that extends transversely across the roof. The roof bow also includes a first side portion on a first lateral end of the central portion. A second side portion is provided on a second lateral end of the central portion. The first and second side portions may be first and second triangular portions that each define a triangular opening.

According to other aspects of this disclosure, the roof bow may include a lower shell that includes a lower portion of the central portion, the first triangular portion and second triangular portion. The roof bow also may include an upper shell that includes an upper portion of the central portion, the first triangular portion and second triangular portion. The lower shell and the upper shell are joined together in a clam shell assembly. The upper and lower shells are sheet metal stampings that are formed of aluminum. The upper and lower shells are welded together about their perimeter.

According to an alternative embodiment of this disclosure, the roof bow may include a front extrusion that includes a front portion of the central portion and a front leg of the first triangular portion and a front leg of the second triangular portion. A rear extrusion may include a rear portion of the central portion and a rear leg of the first triangular portion and a rear leg of the second triangular portion. A right side leg extrusion may is joined to the front leg of the first triangular portion and the rear leg of the first triangular portion. A left side leg extrusion is joined to the front leg of the second triangular portion and the rear leg of the second triangular portion. The front legs of the front extrusion and the rear legs of the rear extrusion may be joined to the right and left side extrusions by a miter joint. The right and left side leg extrusions may each define a plurality of access openings for joining the roof bow to the vehicle.

According to further aspects of this disclosure, the triangular portions each include a front leg that extends outwardly in a forward direction, a rear leg that extends outwardly in a rearward direction and a side leg that is joined to the front leg and rear leg and extends in a longitudinal vehicle direction. The side legs may each define a plurality of access openings for joining the roof bow to the vehicle.

The roof bow may include a front step flange and a rear step flange that both extend across the first side portion, the central portion, and the second side portion. The roof bow may also include a forward rib and a rearward rib that extend laterally across the roof bow and diverge outwardly in the first and second side portions.

According to another aspect of this disclosure as it relates to a support structure for a vehicle roof panel, an outer roof panel is disclosed that is supported by a right roof rail on a right side of the outer roof panel and a left roof rail on a left side of the outer roof panel. A roof bow includes a central portion extending transversely across the roof with a first triangular portion on a first lateral end of the central portion that defines a first triangular opening. A second triangular portion on a second lateral end of the central portion defines a second triangular opening. A right side bracket may be attached to the right side roof rail and the first triangular portion. A left side bracket may be attached to the left side roof rail and the second triangular portion.

According to other aspects of the disclosed roof, a right B-pillar and a left B-pillar are provided and the right side bracket and the left side bracket each extend both in front of and in back of the B-pillars to a greater extent that the first and second triangular portions of the roof bow. The right B-pillar and the left B-pillar may be laterally aligned with the central portion.

According to an additional aspect of this disclosure a vehicle body structure is provided that includes an outer roof panel and a roof rail supporting a side of the roof panel. A B-pillar supports an intermediate portion of the roof rail and a bracket is attached to the roof rail that extends fore-and-aft of the B-pillar. A roof bow has a central portion that extends transversely across the roof panel. A front leg extends outwardly from the central portion in a forward direction to a longitudinally extending side leg. A rear leg extends outwardly from the central portion in a rearward direction to the side leg. An impact force from a side impact collision test or a roof crush test with the vehicle is transferred to the bracket. The bracket transfers the impact force to the side leg. The side leg, in turn, transfers the impact force to one or both of the front leg and the rear leg. The front leg and rear leg then transfer the impact force to the central portion of the roof bow.

According to other aspects of the vehicle body structure, a lower shell may be provided that includes a lower portion of the central portion, the front leg, the rear leg and the side leg. An upper shell may be provided that includes an upper portion of the central portion, the front leg, the rear leg and the side leg. The lower shell and the upper shell may be joined together in a clam shell assembly. The sheet metal stampings may be aluminum, and the lower shell and the upper shell may be joined about a perimeter of each by welding.

According to an alternative body structure, a front extrusion may include a front portion of the central portion and the front legs. A rear extrusion may include a rear portion of the central portion and the rear legs. A side extrusion may be attached to a distal end of each of the front legs and a distal end of each of the rear legs with the side extrusion being attached to the bracket.

The above aspects of this disclosure and other aspects are described below in greater detail and with reference to the attached drawings.

BRIEF DESCRIPTION OF THE DRAWINGS

FIG. 4 is a perspective view of a bow-tie roof bow made with a clamshell construction;

FIG. 5 is an exploded perspective view of the bow-tie roof bow of FIG. 4 made having a clamshell construction with the two parts of the clamshell separated from each other;

FIG. 6 is a fragmentary perspective view of a roof structure including a bow-tie roof bow of FIG. 4 made with a clamshell construction attached to right and left brackets and right and left roof rails in the area of the B-pillar;

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1A:
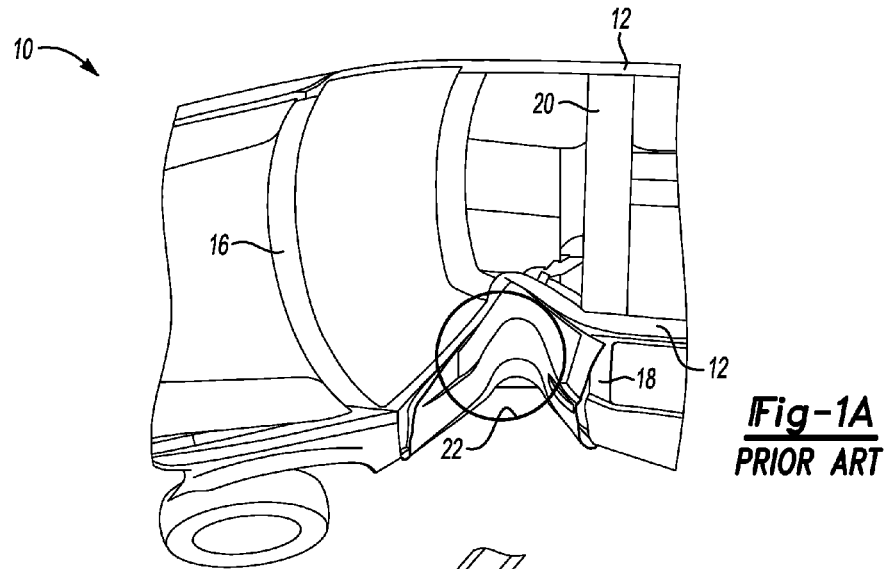
FIG. 1A is a top perspective view of the result of an impact on the prior art roof design after a FMVSS Side Pole Impact Test.

Referring to FIG. 1A, a vehicle 10 made according to the teachings of the prior art is shown following a FMVSS side pole impact test. The vehicle 10 includes a roof rail 12 that extends along the side of the vehicle 10. A-pillar 14 supports a windshield header 16. B-pillar 18 is aligned with a central bow 20. The roof rail 12 extends from the A-pillar 14 to the B-pillar 18. A circle 22 indicates the intrusion area with the vehicle 10 contact at a pole 26, as shown in FIG. 1B.

Figure 1B:
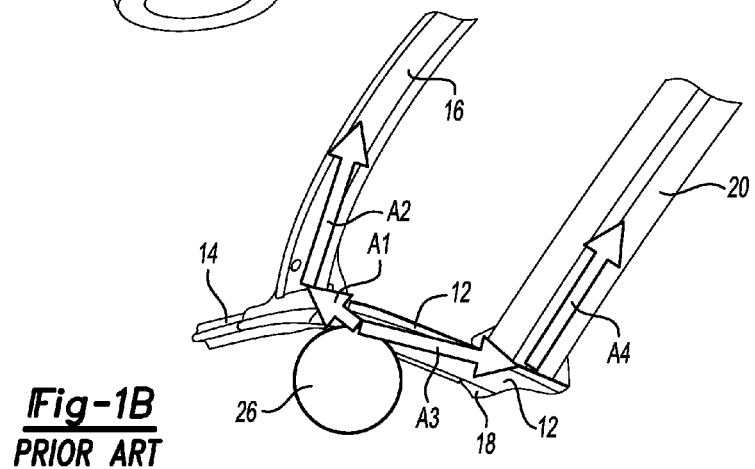
FIG. 1B is a diagrammatic view showing the load path for a prior art roof structure in a FMVSS Side Pole Impact Test.

Referring to FIG. 1B, the pole 26 is shown engaging the prior art roof rail 12 between the A-pillar 14 and the B-pillar 18. The impact force depicted in arrows showing that part of the force follows the direction of arrow A1 that, in turn, transfers the force to the windshield header 16, as indicated by the arrow A2. Another portion of the force depicted by arrow A3 showing force being transferred through the roof rail 12 to the central bow 20, as indicated by arrow A4.

Figure 2:
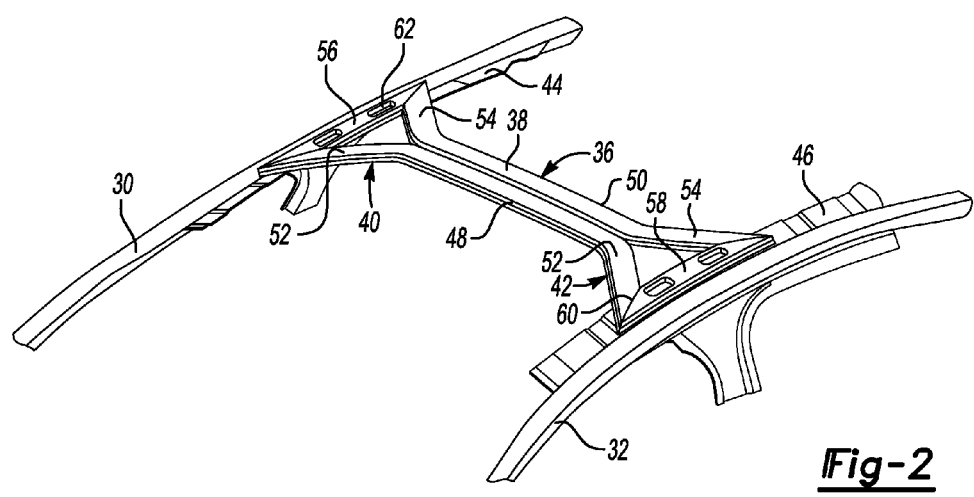
FIG. 2 is a fragmentary perspective view of a "bow-tie" shaped roof bow assembled from extruded tubular component parts.
Figure 3A:
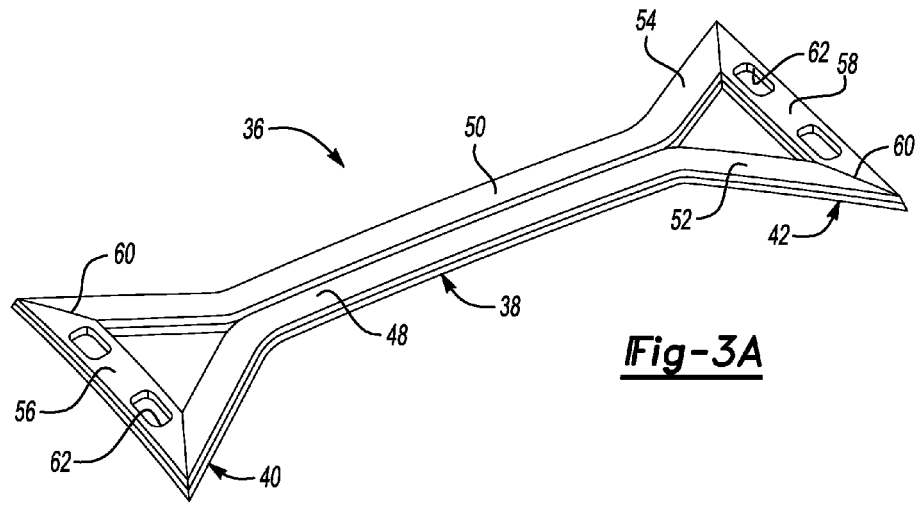
FIG. 3A is a perspective view of the "bow-tie" shaped roof bow shown in FIG. 2.
Figure 3B:
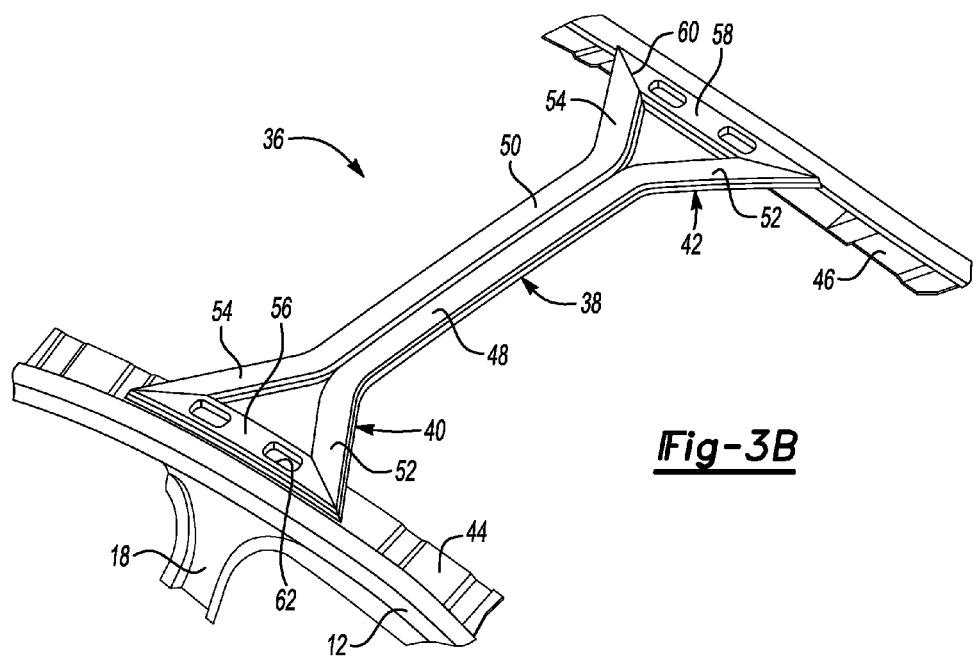
FIG. 3B is a fragmentary perspective view of a roof structure including the bow-tie roof bow shown in FIG. 2 attached to brackets and roof rails on opposite sides of a vehicle.

Referring to FIGS. 2, 3A and 3B, a right roof rail 30 and a left roof rail 32 are connected by a bow-tie roof bow 36. The bow-tie roof bow 36 in this embodiment is assembled from extruded parts to provide a strong, lightweight roof bow. The bow-tie roof bow 36 includes a central portion 38 that extends between a right triangular portion 40 and a left triangular portion 42. A right bracket 44 and a left bracket 46 are attached to the right roof rail 30 and left roof rail 32, respectively. The right triangular portion 40 and left triangular portion 42 are connected to the right bracket 44 and left bracket 46, respectively.

A front extrusion 48 and rear extrusion 50 are assembled together to form the central portion 38 and the right and left triangular portions 40 and 42. A rear extrusion 50 is assembled to the front extrusion 48. The front extrusion 48 includes a front leg 52 that extends from the central portion to form the front of the triangular portions 40 and 42. A rear leg 54 is part of the rear extrusion 50 and forms a rear portion of the right and left triangular portions 40 and 42. A right side extrusion 56 joins the front leg 52 and rear leg 54 on the right side of the roof bow 36. A left side extrusion 58 interconnects the front leg 52 and rear leg 54 on the left side of the bow-tie roof bow 36. The front and rear legs 52 and 54 are joined to the right side extrusion and left side extrusion with a miter joint 60.

Access holes 62 are provided on the right side extrusion 56 and left side extrusion 58 for assembling fasteners or welding the bow-tie roof bow 36 to the right bracket 44 and left bracket 46.

Referring to FIGS. 4 through 6, an alternative embodiment of a bow-tie roof bow 64 is illustrated that has a clamshell structure. The bow-tie roof bow 64 includes a central portion 68 that is flanked by a right triangular portion 70 and a left triangular portion 72. The right triangular portion 70 is attached to a right bracket 74. The left triangular portion 72 is connected to a left bracket 76. The bow-tie roof bow 64 includes an upper shell 78 and a lower shell 80 that are assembled together and welded about their periphery to form the bow-tie roof bow 64. The triangular portions 70, 72 each include a front leg 82 and a rear leg 84 that extend forward and rearward, respectively, from the central portion 68. The right triangular portion 70 also includes a right side 86 and the left triangular portion 72 includes a left side 88.

Access holes 90 are provided in the right side 86 and the left side 88 to provide access for fasteners or welding.

In both the bow-tie roof bow 36 and bow-tie roof bow 64, the roof bows are attached to the right brackets 44, 74 and left brackets 46, 76. The right and left brackets have a greater longitudinal extent than the right and left sides 86 and 88 and the right side extrusion 56 and left side extrusion 58. The triangular portions of the bow-tie roof bows 36 and 64 extend to a greater extent longitudinally than the length of the connection between the B-pillars 18 and roof rail 12. In the FMVSS Side Pole Impact Test, the impact forces are transferred initially to the roof rail 12 then to one of the side brackets 74, 76. The forces are then transferred to the sides 56, 58, 86, 88. The impact forces are then transmitted to the central portions 38, 68 through the front legs 52, 82 and rear legs 54, 84.

Figure 7:
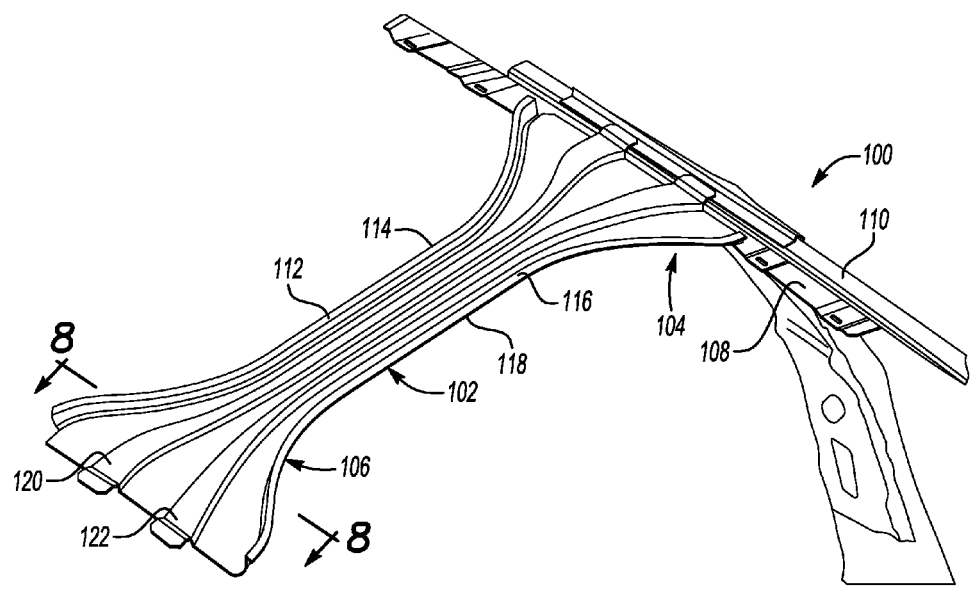
FIG. 7 is a perspective view of a "bow-tie" shaped roof bow formed as a one-piece sheet metal stamping.
Figure 8:
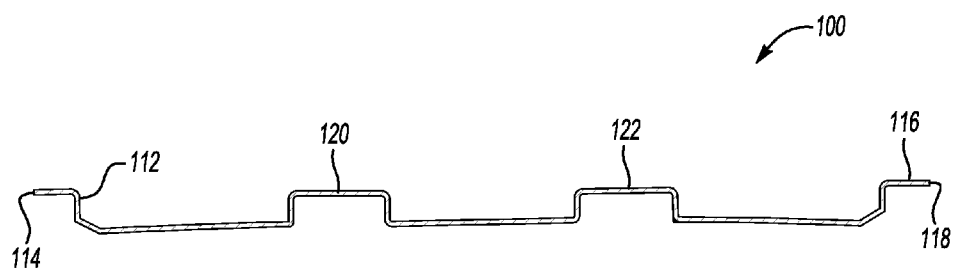
FIG. 8 is a cross-sectional view taken along the line 8-8 in FIG. 7.

Referring to FIGS. 7 and 8, an alternative embodiment of a "bow-tie" shaped roof bow 100 is illustrated that may be formed in a sheet metal stamping operation. The stamped roof bow 100 includes a central portion 102, a right side portion 104, and a left side portion 106. The right side portion 104 is attached to a right bracket 108. The left side portion 106 is attached to a left bracket (not shown) that is a mirror image of the right bracket 108. The right bracket 108 is attached to a roof rail 110 of the vehicle. The side portions 104 and 106 are wider than the central portion 102 and are at least twice as wide as the central portion 102.

A front step flange 112 is formed at a front edge 114 of the roof bow 100. A rear step flange 116 is formed at a rear edge 118 of the roof bow 100. A forward rib 120 extends laterally across the roof bow 100 and a rearward rib 122 extends laterally across the roof bow 100. The forward rib 120 and rearward rib 122 diverge in the side portions 104 and 106 and are parallel to each other in the central portion 102. The step flanges 112 and 116 and the ribs 120 and 122 function to reinforce the roof bow 100.

Figure 9:
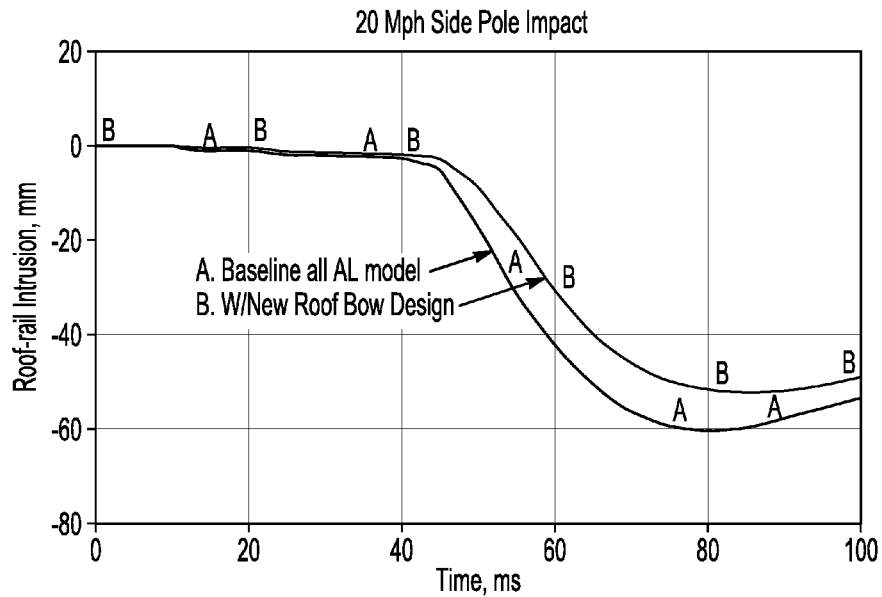
FIG. 9 is a chart of a test of roof rail intrusion comparing an all-aluminum roof bow to a bow-tie roof bow design in a 20 mph FMVSS Side Pole Impact Test.

Referring to FIG. 9, the bow-tie roof bows are shown compared to a baseline all aluminum roof bow. In the chart of FIG. 7, the baseline all-aluminum roof bows represented by the line A and the bow-tie roof bow is represented by line B. Comparing line B to line A, the intrusion is reduced by approximately 10 mm beginning at approximately 60 milliseconds into the test through 90 milliseconds into the test. Reducing intrusion by 10 mm represents a substantial improvement in roof bow performance in the 20 mph FMVSS Side Pole Impact Test.

Figure 10:
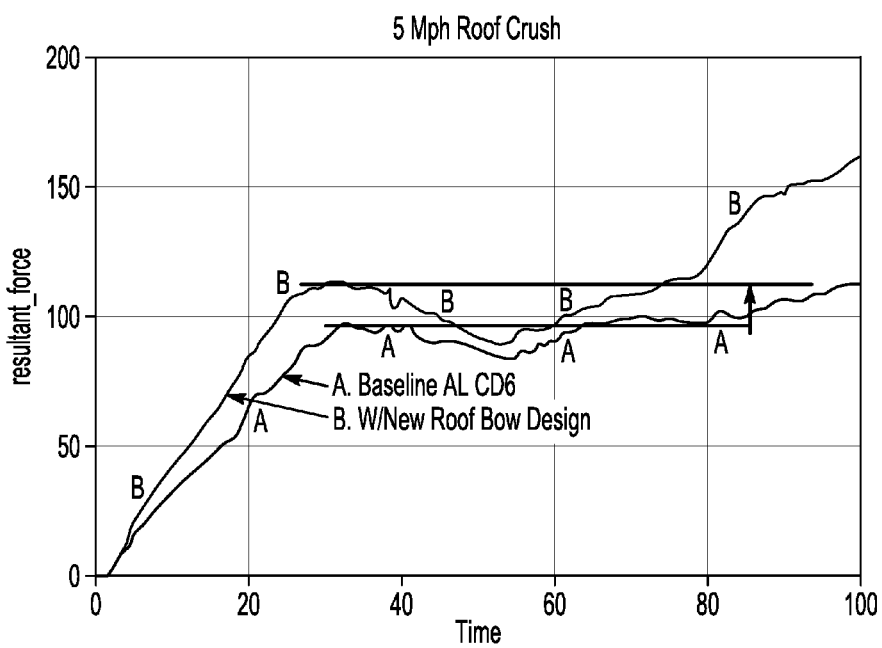
FIG. 10 is a chart of a 5 mph FMVSS roof crush test comparing a baseline all-aluminum bow to the bow-tie shaped roof bow design.

Referring to FIG. 10, another chart is provided of a 5 mph Roof Crush Test. Again, the baseline all-aluminum roof bow is represented by line A and the bow-tie roof bow design is represented by line B. This test result shows that the bow-tie roof bow design increases the force in MPAs of approximately 20 MPAs when averaged over the period of the test from approximately 30 mm to 80 mm. This represents an improvement of approximately 20% compared to the baseline all aluminum roof bow design.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A roof bow for a vehicle having a roof comprising:
   a central portion extending transversely across the roof;
   a first triangular portion on a first lateral end of the central portion that is wider than the central portion;
   a second triangular portion on a second lateral end of the central portion that is wider than the central portion;
   a lower shell that includes a lower portion of the central portion, and the first triangular portion and the second triangular portion; and
   an upper shell that includes an upper portion of the central portion, the first triangular portion and the second triangular portion, wherein the lower shell and the upper shell are joined together in a clam shell assembly.

2. The roof bow of claim 1 wherein the lower shell and upper shell are aluminum, and wherein the lower shell and the upper shell are joined about a perimeter of each by welding.

3. The roof bow of claim 1 wherein the triangular portions each include a front leg that extends outwardly in a forward direction, a rear leg that extends outwardly in a rearward direction and a side leg that is joined to the front leg and rear leg and extends in a longitudinal vehicle direction.

4. The roof bow of claim 3 wherein the side legs each define a plurality of access openings for joining the roof bow to the vehicle.

* * * * *